United States Patent Office 3,101,630
Patented Aug. 27, 1963

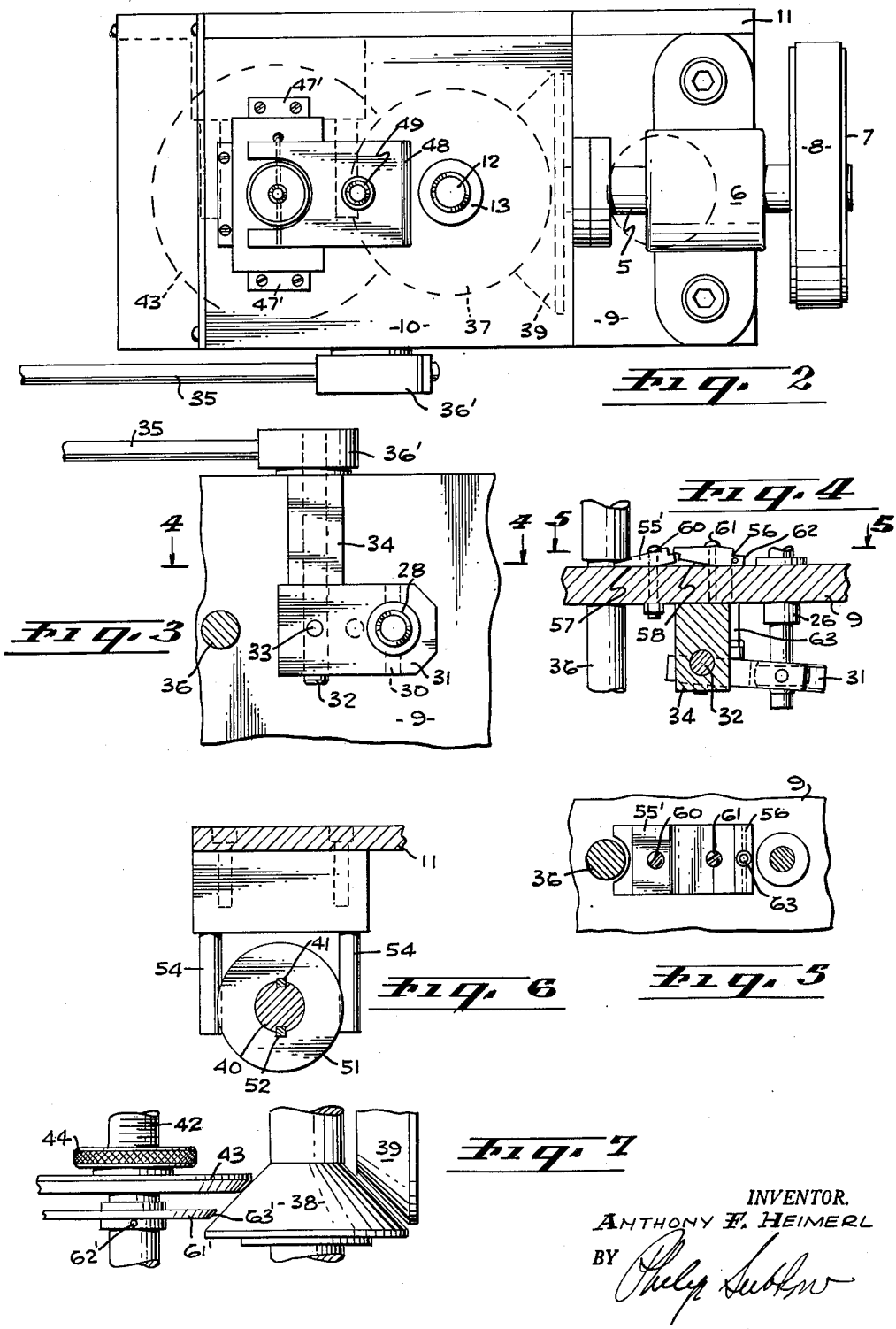

3,101,630
TAPPING OR DRILLING MACHINE POWER TRANSMISSION
Anthony F. Heimerl, Santa Monica, Calif., assignor to Statham Instruments, Inc., Los Angeles, Calif., a corporation of California
Filed Feb. 19, 1962, Ser. No. 174,131
5 Claims. (Cl. 77—34.4)

This invention relates to a machine tool for advancing a rotating cutting tool into a work, and is more particularly directed to a drilling or tapping machine.

In operating machine tools of the above class, wherein the advance of the tool and the axial load is dependent on the operator, difficulty arises. Thus, as the cutting tool dulls and the operator exerts an excessive axial force, the cutting tool may break. Additionally, should the chips accumulate to wedge the tool, an excessive torque may be developed which may, under certain conditions, snap the tool. Additionally, the advance of the tool, if dependent upon the operator's skill, is uncertain, so that the depth of cut becomes somewhat uncertain.

It is an object of my invention to provide a machine tool of the above type whereby the rotating cutting tool is advanced a predetermined distance and then automatically stopped. It may then be retracted.

It is a further object of my invention to provide a tool of the above class wherein the axial force applied to the tool is preset and is not dependent upon the operator. It is also an object of my invention to provide a tool of the above class wherein the rate of advance of the rotating tool may be preset.

These and further objects of my invention will be understood by those skilled in the art by reference to the drawings, of which:

FIG. 2 is a view taken along line 2—2 of FIG. 1;

FIG. 3 is a detail view, partly in section, taken on line 3—3 of FIG. 1;

FIG. 4 is a section taken along 4—4 of FIG. 3;

FIG. 5 is a detail taken along 5—5 of FIG. 4;

FIG. 6 is a detail taken along 6—6 of FIG. 1; and

FIG. 7 shows a detail of a modification of the tool of my invention.

Figure 1:
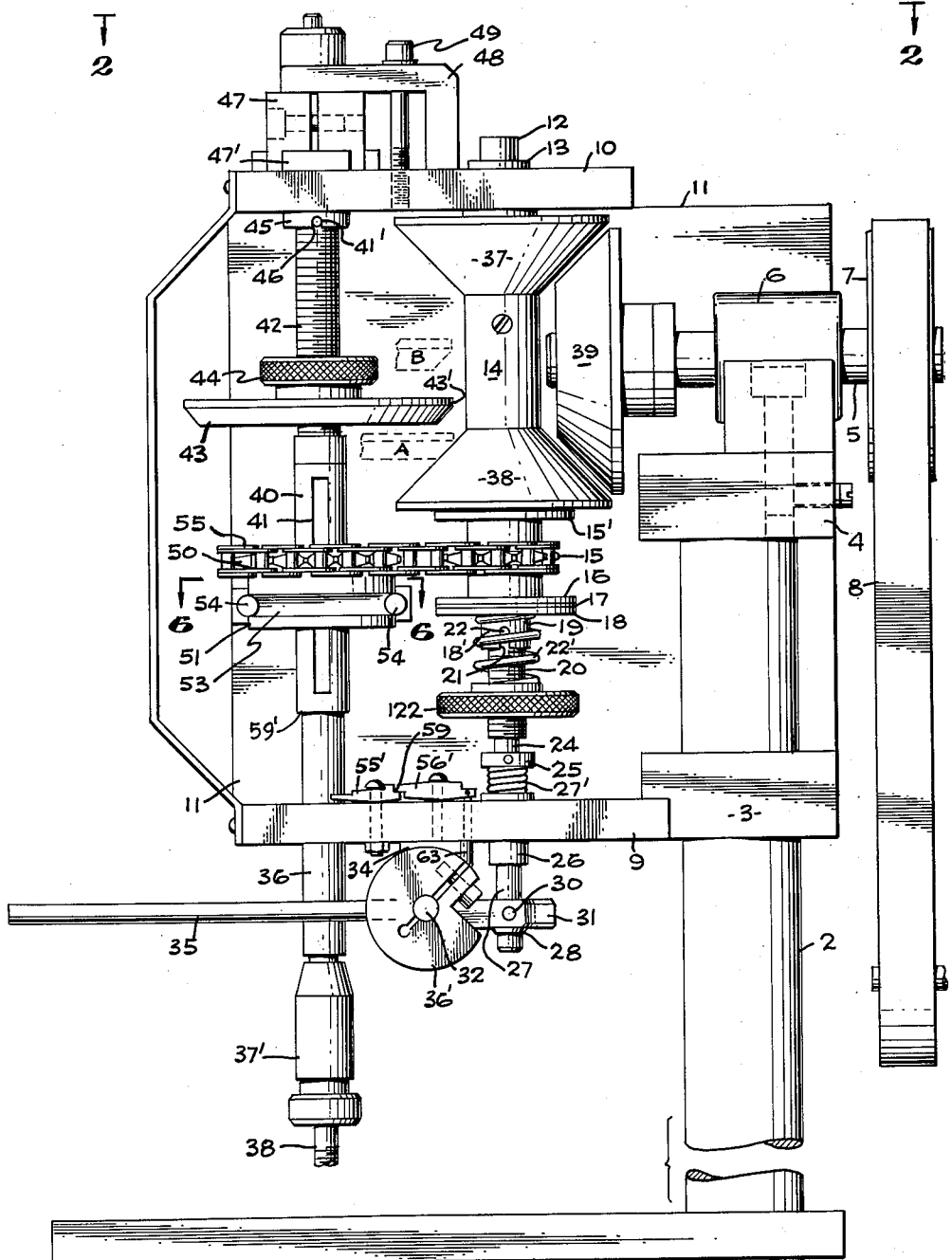
FIG. 1 is a vertical side view of the tool of my invention.

The base 1 carries the standard 2 on which is adjustably mounted a block 4, carrying the shaft 5 rotatably mounted in a bearing 6 and carrying the pulley 7 and belt 8, driven from any suitable power source. Mounted on the block 3 is the platform 9. Block 3 is connected by plate 11 to block 4. Plate 11 carries the plate 10 and platform 9. A top plate 10 is mounted on the side plates 11, carried on the base 1. A shaft 12, journaled in the bearing 13 positioned in the plate 10, carries the spool 14, adjustably positioned on the shaft 12 by means of a set screw. Sleeve 19 also carries the sprocket 15 and plate 16 of the friction clutch 17 and 15'. The complementary faces of clutch 15' are mounted one on the spool cone 38 and the other on the sleeve 19. The friction clutch face 16 is mounted on the sleeve 19, and the complementary face 18 on the sleeve 18'. Rotation between the shaft 20 and the plate 18 is produced by means of the notch 21 in the sleeve 19 and the pin 22 on the stub shaft 20. The stub shaft 20 is threaded to receive a nut 122. The spring 22' is positioned between the nut 122 and the plate 18. The extension 24 of the shaft 20 carries a collar 25 and extends through platform 9 in suitable bearings 26. The spring 27' is placed on shaft 24 between the collar 25 and the platform 9. The extension 27 of the shaft 24 is rotatably mounted on the bearing 28, positioned in the block 31 (see FIGS. 3 and 4). Block 31 is pivotally mounted on bearing 28 by means of pivot pin 30. The block 31 connects to shaft 32 by set screw 33 and is rotatably mounted in the block 34, positioned underneath the platform 9. It is connected to the arm 35 by the clamp 36'.

The cone 39, mounted on the shaft 5, is positioned between the cones 37 and 38 of the spool 14.

Shaft 36, carrying the chuck 37' for the tool 38', is rotatably mounted in the table 9 and carries a section of larger diameter 40, on which is mounted a key 41. The upper extension 42 of the shaft 36 is threaded and carries a threaded disc 43, with a truncated, conical edge section 43' and the lock nut 44.

The shaft 42 is rotatably connected to a lead screw 45 by the notch 46 in the lead screw 45 and the pin 41' in the shaft 42. A split nut 47 is held in position by the bracket 48, held on the plate 10 by the stud 49, between centering blocks 47'.

The sprocket 50 is mounted on the sleeve 51, which carries a keyway 52 (see FIG. 6) and an external groove 53. The sleeve 50 is slidably mounted on fingers 54, mounted in the wall 11. A sprocket chain 55 drives the sprocket 50 from the sprocket 15.

Fingers 55' and 56 are pivotally mounted on table 9. They ride on their arcuate bottoms 57 and 58, on the table 9, and are held on the table 9 by means of bolts 60 and 61 so as to permit them to rock on table 9 (see FIGS. 4 and 5). Finger 55' carries a notch 59 to engage the end of the finger 56. Finger 56 has an extension 62 to which is connected a rod 63 which passes through the table 9 and is connected to the block 31.

With the shaft 5 stationary and the arm 35 undeflected, the collar 25 and nut 22 are adjusted so that the weight of the assembly is balanced by the spring 27' and the cone 39 is positioned centrally between the cones 37 and 38.

With the motor stationary and the arm 35 horizontal, cone 39 contacts cone 37. Assume that the stroke limit disc 43 is positioned at position B. The arm 35 is depressed. This raises the shaft 27, to contact the cone 38 with the cone 39, and presses the plates of the friction clutch 17 and 18 together. Shaft 5 is rotated, and the rotation is transmitted from 39 to 38 to shaft 40 by the chain and sprocket drive. The rotation of the shaft 40 rotates the lead through 45 and the nut 47 and feeds the shaft 42 down through the sleeve 53. When the tool has reached the limit of its lower travel which is desired for the tool, the arm 35 is raised to its central position. This pulls the shaft 27, compressing the spring so the weight of the assembly rides on the spring 27' and the cone 39 is again centrally between the cones 37 and 38. This stops the machine and the tool movement. With the power off, the arm 35 is again depressed, central cone 39 contacts cone 38, and the stroke limit disc is adjusted so that it makes firm contact with the cone 38 (see position A).

The arm 35 is now lifted above its neutral position. This pulls the shaft 27, collar 25 and shaft 20 downward, compressing the spring 27'. The weight of the assembly now rests on cone 37 and cone 39, rotating the tool to raise the tool. This continues until the edge 43' of the disc 43 contacts the conical surface of the cone 37, and any further rotation lifts the spool, to break the contact between the cone 37 and the cone 39. This stops the rotation of the spool 14 and prevents the nut 44 from hitting the lead screw 45.

As will be observed, clutch 17 may be omitted if desired. But since 15 and 17 are slipping clutches, it provides a safety feature.

Provision is made to prevent the override of the tool, even if the setting of the disc 43 has not been made adequately, or if it has moved after setting. Unless such precaution is taken, the shaft 36 may descend sufficiently to force the shoulder 59' against the table 9, thus stalling the machine tool.

When 59' contacts the end of finger 55', it will rock the finger counterclockwise, which lifts the end of the finger 56, interlocking with the step 59 of the finger 55'. This depresses the extension 62 and the rod 63, which thus rotates the arm 35 clockwise and pulls the shaft 27 downward, to disengage cone 38 from cone 39.

FIG. 7 shows an alternative arrangement which may replace the safety latch composed of fingers 55' and 56 and the associated mechanism. Thus, I may mount the conical disc 61' by means of a set screw 62' on the shaft 42, underneath the disc 43. Disc 61' has a conical edge 63' of the same slope as the cone 38 and the disc 43, and being of smaller diameter, and it is set on the shaft 42 so that it will contact the cone 38 just prior to the arrival of the shoulder 59' at the platform 9. Thus, if, for some reason, the cone 42 has been incorrectly set, the cone 63 will contact the cone 38 and depress the cone, to separate it from the cone 39 and stop the machine before the shoulder 59' hits the table 9.

With the work set into place, the tool 38 set in position, and the machine adjusted, the arm 35 is depressed, contacting cones 38 and 39. The tool is rotated and advanced at the rate determined by the pitch of the lead screw 45 and is independent of the pressure exerted on 35. It will also be observed that the axial force on the tool 38 is determined by the pitch of the lead screw and the force exerted by the spring 22'. If the resistance to rotation of the tool is excessive, slippage will occur at the clutches 15 and 17, and twist off at the tool 38 is prevented.

When the tool has advanced the distance determined by the setting of the disc 43, the disc contacts the cone 38, pulling it away from the cone 39, stopping the machine.

The tool 38 may be withdrawn by moving the arm 35 upward to contact the cones 39 and 37, as described above.

While I have described a particular embodiment of my invention for purposes of illustration, it should be understood that various modifications and adaptations thereof may be made within the spirit of the invention, as set forth in the appended claims.

I claim:
1. A machine tool comprising
    (1) a shaft and a power transmission spool mounted on said shaft,
        (a) said spool including a pair of spaced cones;
    (2) a power transmission cone rotatably mounted between said cones referred to in (a) above, on an axis perpendicular to the said shaft, and means to rotate said power transmission cone from a power source;
    (3) means to rotatably mount said shaft and means to axially displace said shaft;
    (4) a second shaft rotatably mounted adjacent to and along said first-named shaft;
        (a) a power transmission means from said first named shaft to said second shaft;
    (5) a lead screw connected to said second shaft, to axially move said shaft during rotation;
    (6) a stop disc mounted on said second shaft and extending between said spaced cones on said spool;
    (7) and means to mount a rotating cutting tool at one end of said second shaft.
2. In the machine tool of claim 1, said means referred to in (3) of claim 1 including bearings for said shaft referred to in (1) of claim 1, a spring support connected to said shaft, and means to axially displace said shaft through said bearings.
3. In the machine tool of claim 1, said shaft referred to in (1) of claim 1 comprising a pair of axially aligned shafts, one of said pair of said shafts connected to said spool, the second of said shafts of said pair of shafts connected to one end of a compression spring, the other end of said compression spring mounted on a support, and means to transmit rotation between said shafts, and means to transmit axial displacement of said second shaft of said pair of shafts to the first mentioned shaft of said pair of shafts.
4. In the machine tool of claim 1, means to adjustably mounted said stop disc along said second shaft.
5. In the machine tool of claim 1,
    (1) a platform;
    (2) said first and said second shafts referred to in claim 1, being rotatably mounted in said platform;
    (3) a shoulder on said second shaft between said stop disc and said platform, said means referred to in (2) of claim 1 to axially displace said shaft in said bearing comprising
    (4) a lever, a pivot for said lever mounted under said platform, a bearing for said first shaft referred to in (1) of claim 1 mounted on said lever, said shaft being rotatably mounted in said bearing; and
    (5) a rocker arm mounted for rocking action on said platform, means connected to said rocker arm to move said bearing and lever referred to in (4) above on contact of said shoulder referred to in (3) above with said rocker arm.

References Cited in the file of this patent
UNITED STATES PATENTS

| | | |
|---|---|---|
| 1,160,607 | Housel | Nov. 16, 1915 |
| 2,237,905 | Haffling | Apr. 8, 1941 |